Feb. 1, 1927.

S. T. YOURTEE

TRACTOR

Filed Oct. 5, 1925

S. T. Yourtee INVENTOR

BY Victor J. Evans

ATTORNEY

WITNESS:

Feb. 1, 1927.

S. T. YOURTEE 1,616,295

TRACTOR

Filed Oct. 5, 1925  3 Sheets-Sheet 2

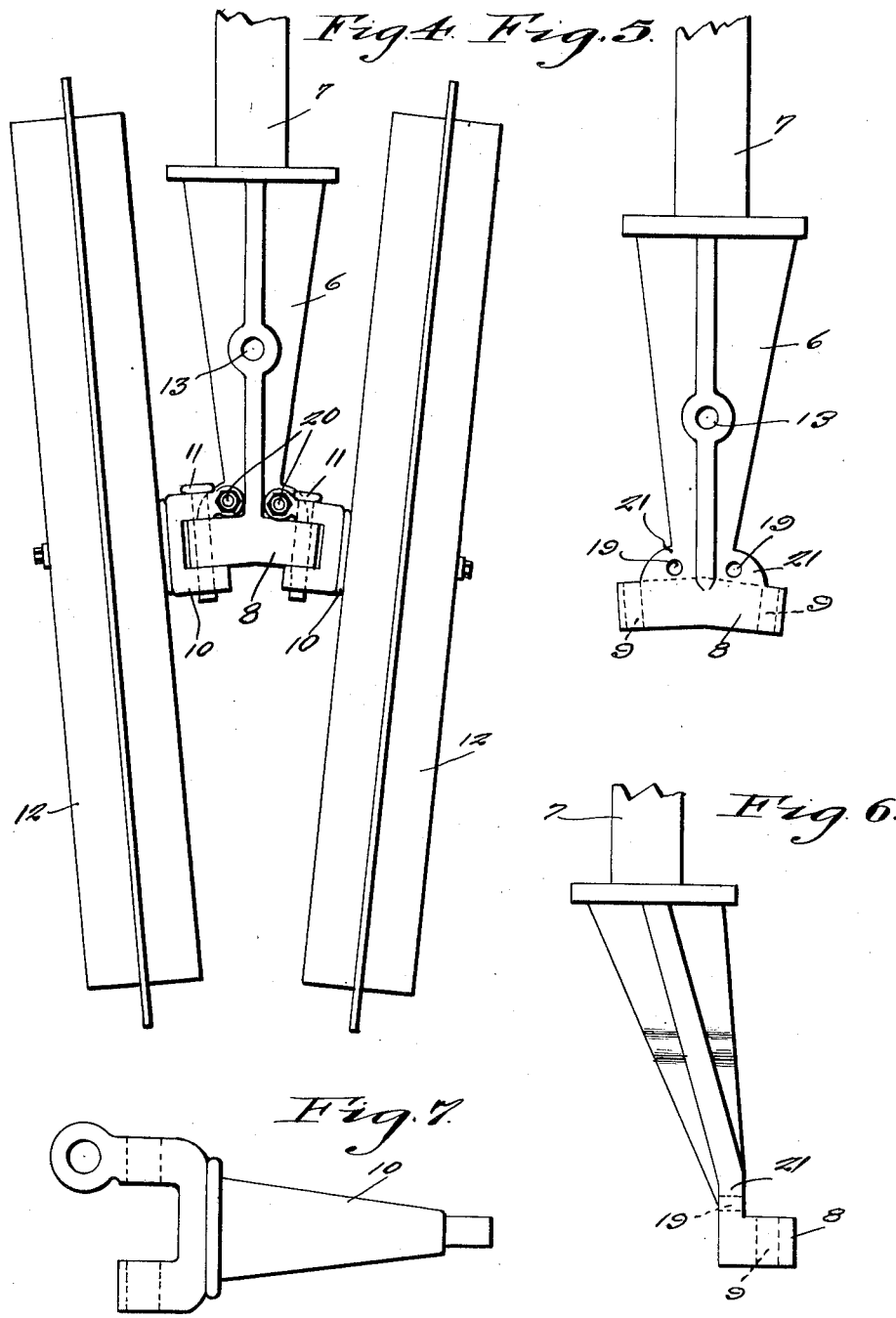

Patented Feb. 1, 1927.

1,616,295

UNITED STATES PATENT OFFICE.

SAMUEL TILGHMON YOURTEE, OF DELTABRIDGE, LOUISIANA.

TRACTOR.

Application filed October 5, 1925. Serial No. 60,604.

This invention relates to a tractor, the general object of the invention being to provide a supporting frame which will support the tractor at such a height from the ground that it can be used for cultivating plants which are of considerable height.

Another object of the invention is to provide a frame having a caster wheel arrangement at its front end with means for attaching it to the rear part of the tractor and to the front part thereof, in place of the front axle, so that the device will act as an attachment for tractors now on the market, to enable such tractors to be used in cultivating crops of considerable height.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 4 is a front view of the caster arrangement.

Figure 5 is a view of the front wheel supporting member.

Figure 6 is a side view of such member.

Figure 7 is a view of one of the spindles.

Figure 1:
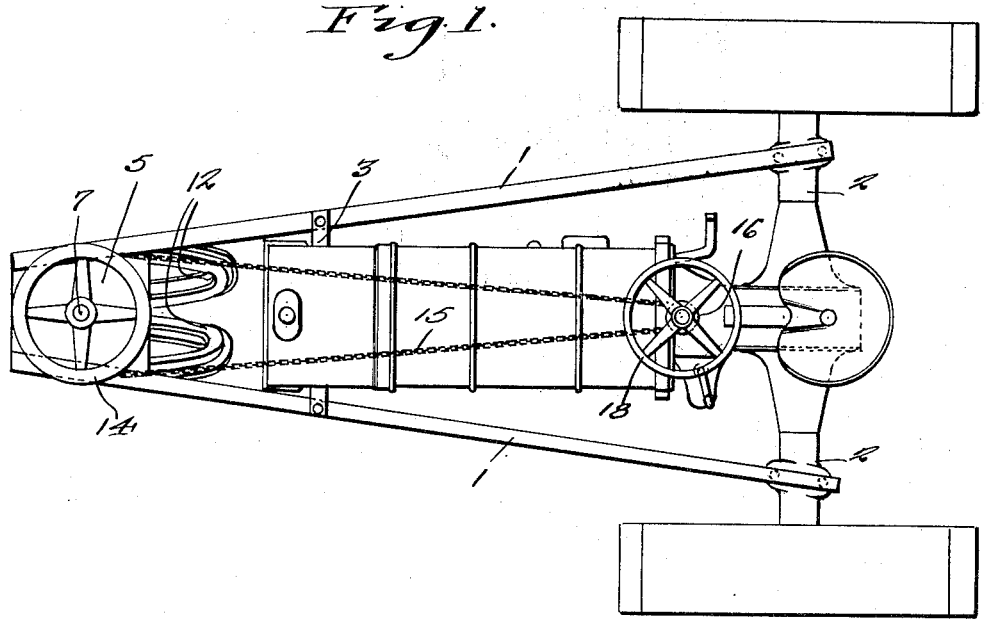
Figure 1 is a plan view of a tractor provided with my invention.
Figure 2:
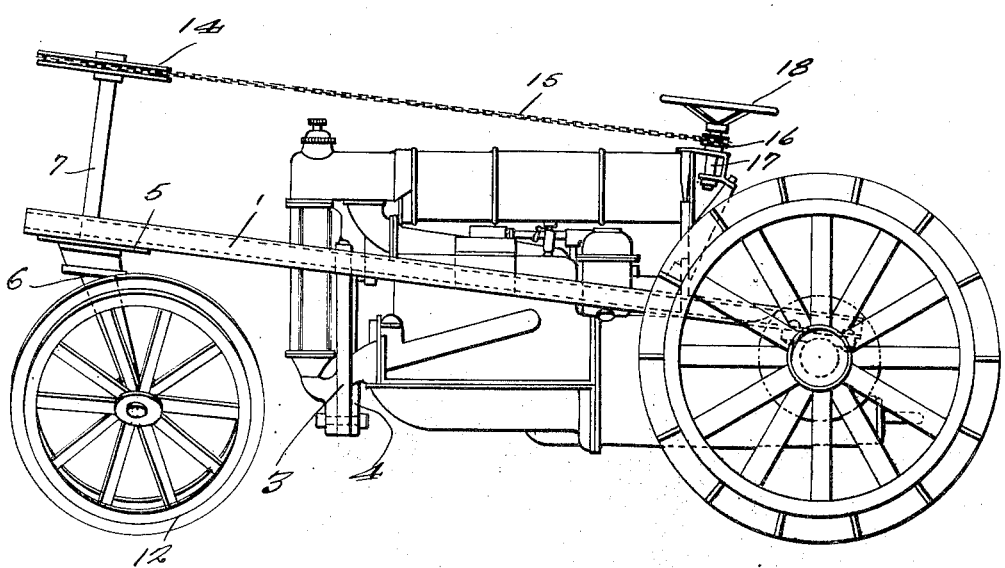
Figure 2 is a side view thereof.
Figure 3:
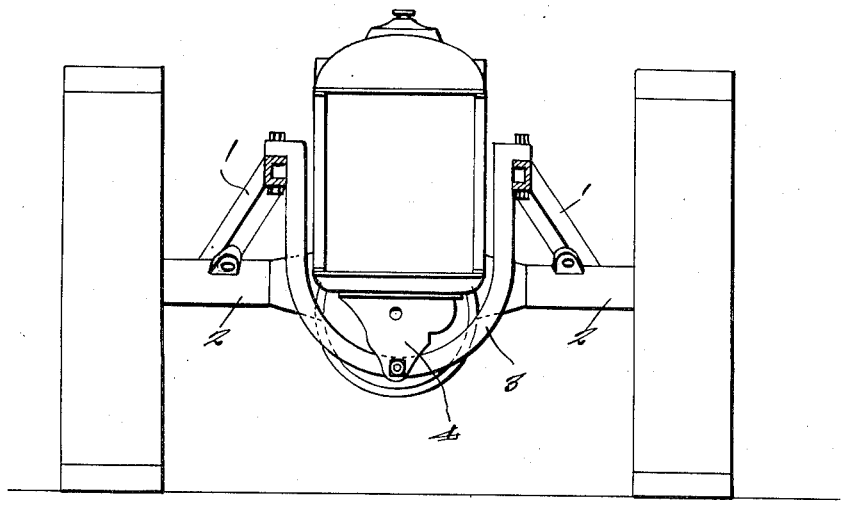
Figure 3 is a transverse sectional view through the extension frame, the section being taken immediately in front of the tractor.
Figure 8:
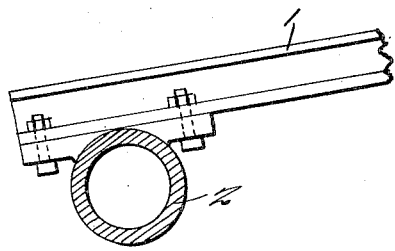
Figure 8 is a view of the rear end of one of the side bars of the frame.
Figure 9:
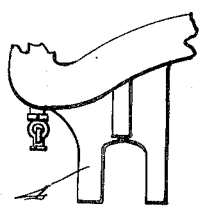
Figure 9 is a detail view of the bracket at the front of the tractor, for receiving the stirrup part of the frame.

In these views, 1 indicates a pair of side bars which have sleeves 2 fastened to the rear ends thereof which form extensions of the rear axle housing of the tractor, the rear axles of the tractor being replaced by longer ones which pass through these sleeves. Thus the rear wheels of the tractor are spaced farther apart than in the ordinary construction. These beams or bars 1 converge and a stirrup 3 has its ends fastened to the bars an appreciable distance from the front ends thereof. This stirrup passes through the forked bracket 4 at the front end of the tractor and replaces the front axle of the tractor which is pivoted to the bracket at its center. The front ends of the bars 1 are fastened to a platform 5 which rests upon a casting 6 and which has a shaft 7 connected therewith which passes through a vertical hole in the platform. The lower end of the casting is provided with the obtuse angled part 8 having the holes 9 therein and the forked parts of the spindles 10 engage the ends of this angled part, the spindles being fastened thereto by the pins 11 which pass through the holes 9 and the bolts 20 which pass through the holes 19 formed in flaring parts 21 above the part 8. Thus the spindles are supported at an angle to the horizontal so that the wheels 12 each sit at an angle to the vertical with their ground engaging portions being close together. A hole 13 is formed in the casting so that a starting crank with a long shaft can be passed through the hole to crank the motor. The upper end of the shaft 7 has a pulley 14 thereon over which passes a chain 15 which also engages a sprocket 16 on the shaft 17 of the steering wheel 18. This wheel and its shaft is slightly different from the wheel and shaft on the original tractor.

From the foregoing, it will be seen that a tractor of the Fordson type, provided with this attachment, can be used for cultivating crops of considerable height. By making the rear wheels farther apart, the rear part of the tractor can straddle two ordinary spaced rows of plants, and the front wheels pass between the two said rows of plants. The arrangement of the two front wheels, which may be the original wheels, and original spindles of the tractor, will give the same effect as one wide wheel, but by separating them, room is provided for the starting crank. The standard front axle of the Fordson type of tractor being discarded, this tractor will pass over plants of considerable height, said height being governed solely by the height of the rear axle housings above the ground, all other interfering parts of Fordson type tractors are discarded.

This arrangement gives the effect of a three wheel tractor, the front wheels and body of the tractor passing between the two rows of plants, and the rear axle housings passing over the said plants, and the two rear wheels pass along the outside of the two said rows. Thus with this attachment the Fordson tractor, or one of the Fordson type can be used for cultivating as well as other work.

As will be seen, the platform 5 and the casting 6 acts as a fifth wheel arrangement for permitting the tractor to be steered through the wheel 18 and its connections with the shaft 7.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An attachment for a tractor, comprising a pair of side beams, sleeves at the rear ends of the beams forming extensions of the rear housing of a tractor and forming bearings for the rear drive shafts of the tractor a stirrup carried by the beams and engaging the front axle housing of the tractor, a platform to which the front ends of the beams are connected, a casting upon which the platform rests, a shaft connected with the casting and passing through the platform, spindles carried by the casting, wheels carried by the spindles, and means for connecting the steering mechanism of the tractor with the shaft of the casting.

In testimony whereof I affix my signature.

SAMUEL TILGHMON YOURTEE.